US008259827B2

(12) United States Patent
Ramesh et al.

(10) Patent No.: US 8,259,827 B2
(45) Date of Patent: Sep. 4, 2012

(54) QUICK PAGING RECEIVERS IN TELECOMMUNICATION SYSTEMS

(75) Inventors: Rajaram Ramesh, Raleigh, NC (US);
Havish Koorapaty, Cary, NC (US);
Kumar Balachandran, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 869 days.

(21) Appl. No.: 12/355,606

(22) Filed: Jan. 16, 2009

(65) Prior Publication Data

US 2010/0182989 A1    Jul. 22, 2010

(51) Int. Cl.
*H04K 1/10* (2006.01)
(52) U.S. Cl. ........ 375/260; 375/340; 375/316; 370/344; 455/522; 455/528
(58) Field of Classification Search .................... 375/260
See application file for complete search history.

(56) References Cited

U.S. PATENT DOCUMENTS

| | | | | |
|---|---|---|---|---|
| 5,237,586 | A * | 8/1993 | Bottomley | 370/206 |
| 6,384,746 | B2 * | 5/2002 | Lee et al. | 341/50 |
| 7,912,491 | B2 * | 3/2011 | Mohanty et al. | 455/522 |
| 8,059,759 | B2 * | 11/2011 | Park et al. | 375/340 |
| 2002/0190786 | A1 * | 12/2002 | Yoon et al. | 329/313 |
| 2007/0098096 | A1 | 5/2007 | Akita et al. | |
| 2008/0168337 | A1 * | 7/2008 | Gaal et al. | 714/784 |
| 2009/0052566 | A1 * | 2/2009 | Maltsev et al. | 375/260 |

FOREIGN PATENT DOCUMENTS

| | | |
|---|---|---|
| EP | 1895725 A | 3/2008 |
| WO | WO 96/04738 A | 2/1996 |

OTHER PUBLICATIONS

Anonymous: "Physical Layer for Ultra Mobile Broadband (UMB) Air Interface Specification" 3GPP2 Specification, Apr. 5, 2007 (Online) http://www.3gpp2.org/public_html/specs/C.S0084-001-0_v1.0_070423.pdf.

* cited by examiner

*Primary Examiner* — Lihong Yu

(57) ABSTRACT

Methods and apparatus by which receiving stations or other communication network nodes can receive quick paging code words assigned by transmitting stations to the receiving stations. A receiving station can estimate the characteristics of the channel to the transmitting station based on a downlink-frame's preamble and use correlation to detect the presence of an assigned code word. The receiving station can suppress interference from other transmitting stations in the correlation operation based on the nature of the interference signal. When the receiving station knows an interfering signal from another transmitting station, the receiving station can subtract the interfering signal before carrying out the correlation operation.

6 Claims, 6 Drawing Sheets

QUICK PAGING RECEIVERS IN TELECOMMUNICATION SYSTEMS

TECHNICAL FIELD

This invention relates to radio communication systems and more particularly to paging in such systems.

BACKGROUND

The Institute of Electrical and Electronic Engineers (IEEE) 802.16 Working Group on Broadband Wireless Access Standards is specifying standards for broadband radio communication systems in wireless metropolitan area networks. The IEEE 802.16 family of specifications is called the Wireless Metropolitan Area Network (WirelessMAN) standard and has been dubbed "WiMAX", which is short for Worldwide Interoperability for Microwave Access, by an industry group called the WiMAX Forum. The mission of the WiMAX Forum is to promote and certify compatibility and interoperability of products complying with the IEEE 802.16 specifications.

The WirelessMAN standard defines aspects of the air interface between a radio transmitter and a radio receiver, including the physical (PHY) layer, and the Medium Access Control (MAC) layer. The WiMAX Forum has defined an architecture for connecting a WiMAX network with other networks, such as networks complying with IEEE 802.11 and cellular networks, and a variety of other aspects of operating a WiMAX network, including address allocation, authentication, etc. FIGS. 1A, 1B show examples of WiMAX networks, and it should be understood that the arrangement of functionalities depicted in FIGS. 1A, 1B can be modified in WiMAX and other communication systems.

As depicted in FIG. 1A, the network 100A includes base stations (BSs) 102, 104, 106, 108 that respectively transmit and receive radio signals in geographic areas called "cells", which typically overlap to some extent as shown. Subscriber stations (SSs) 110, 112 are located in the cells and exchange radio signals with the BSs according to the WiMAX air interface standard. An SS is typically either a mobile SS (MS) or a fixed SS, and it will be understood that a network can include many cells and many SSs. In FIG. 1A, the BSs communicate with and are controlled by Access Service Network (ASN) Gateways (G/Ws) 114, 116 that also communicate with each other, and with other core network nodes and communication networks (not shown), such as the public switched telephone network and the internet. SSs, such as SSs 110, 112, can be organized into groups for paging, as described in more detail below.

FIG. 1B depicts a WiMAX network 100B that also includes BSs 102, 104, 106, 108 and SSs 110, 112 as in the network 100A. The network 100B is more decentralized than the network 100A in that, in FIG. 1B, the BSs communicate with each other directly through a suitable routing network 118 that also communicates with other core network nodes and communication networks (not shown).

According to one mode of IEEE 802.16, the downlink (DL) radio signals transmitted by the BSs are orthogonal frequency division multiple access (OFDMA) signals. In an OFDMA communication system, a data stream to be transmitted by a BS to a SS is portioned among a number of narrowband subcarriers, or tones, that are transmitted in parallel. Different groups of subcarriers can be used at different times for different SSs. Because each subcarrier is narrowband, each subcarrier experiences mainly flat fading, which makes it easier for a SS to demodulate each subcarrier.

The DL radio signals and uplink (UL) radio signals transmitted by the SSs are organized as successions of OFDMA frames, which are depicted in FIGS. 2A, 2B according to a time-division duplex (TDD) arrangement in the IEEE 802.16e standard. FIG. 2B is a magnification of FIG. 2A and shows the format of the DL and UL subframes in more detail than in FIG. 2A. In FIGS. 2A, 2B, time, i.e., OFDMA symbol number, is shown in the horizontal direction and subchannel logical number, i.e., OFDM subcarrier frequency, is indicated by the vertical direction. FIG. 2B shows one complete frame and a portion of a succeeding frame, with each DL subframe including sixteen symbols and each UL subframe including ten symbols, not counting guard symbols.

Each DL frame 200 starts with a preamble signal that includes a known binary signal sent on every third OFDM tone or subcarrier, as depicted by FIG. 3 in the frequency domain for a 2048-point fast Fourier transform (FFT). The range of subcarriers shown in FIG. 3 is numbered 0, 3, 6, ..., 1701, but as explained below, a preamble can use fewer than that many subcarriers.

As seen in FIGS. 2A, 2B, each frame's preamble is followed by a DL transmission period and then an UL transmission period. According to the standard, the preamble signal is sent in the first OFDM symbol of a frame, which is identified by an index k in FIG. 2B, and is defined by the segment, i.e., one of the three sets of tones to be used, and a parameter IDCell, which is the transmitting cell's identification (ID) information. A SS uses the preamble for initial synchronization of its receiver to the BS (the network), and to determine the location of a frame control header (FCH), which is among the first bursts appearing in the DL portion of a frame. A SS also uses the preambles in signals transmitted by neighboring BSs to synchronize to them for purposes of measurement for handover from one cell to another.

The FCH gives information on the DL signal parameters, including a DL map message (DL-MAP), which is a medium access control (MAC) message that defines DL allocations for data, and parameters relevant for reception of the signal. The DL-MAP may be followed by an UL map message (UL-MAP), which provides UL allocations for data, and other parameters relevant for transmission of signals from an identified SS. With the assignments in time and frequency from the DL-MAP, an identified SS can receive the data in the particular location. Similarly, it can identify assignments in time and frequency on the UL-MAP, and transmit accordingly. FIGS. 2A, 2B also show a transmit/receive transition gap (TTG) interval and a receive/transmit transition gap (RTG) interval, which are used by the BS and SS to switch from transmit to receive and vice versa.

FIG. 2A also illustrates how a BS pages an SS operating in idle mode, showing the relationship between paging cycles, paging offset, BS paging interval, and OFDMA frames. Only two of the succession of paging cycles are shown in FIG. 2A. An SS "listens" for a page message from the BS during only a portion of a paging cycle, and the location of that paging interval is determined by a paging offset from the start of the paging cycle. A paging interval can span up to several (e.g., five) OFDMA frames, during which the SS needs to stay "awake" until its paging message received.

Thus, while a SS is idle, the SS periodically turns on its baseband unit, which includes a FFT demodulator and decoder, even when there are no paging messages for it and no system configuration changes/updates. The SS first synchronizes with the preamble and reads the FCH, and it then reads the DL-MAP to look for the location and the format of a broadcast connection identifier (CID). If the DL-MAP shows a broadcast CID, the SS demodulates that burst to determine whether there is a BS broadcast paging message (MOB_PAG-ADV).

Most of the time, there is no paging message and no action required by the SS, but during each paging interval, an SS has to be fully "awake", which is to say, its receiver has to be powered up, for a number of OFDMA frames, using electrical power and possibly draining a battery over time. In addition to MOB_PAG-ADV messages, changes in channel descriptors or broadcast system updates can trigger an idle SS to stay on for updating the system parameters or reading other coming messages.

A "quick" paging mechanism that can reduce the negative effects of the conventional paging mechanism is not specified in current versions of the WiMAX standards. In such a quick paging mechanism, a simple signal would indicate to a group of SSs that a paging signal exists in a subsequently transmitted signal block. Thus far, proposals for quick paging either steal system resources from a system's available resources, thereby reducing system capacity, or occupy transmit and receive gaps in a TDD version of the system, which could lead to issues of compatibility among different device implementations.

A new standard for mobile broadband communication is under development as IEEE 802.16m, which is required to be backward-compatible with products complying with the current WiMAX standards and at the same time should improve performance considerably compared to current WiMAX technology. In developing IEEE 802.16m, a proposal has been made for a quick paging mechanism that is described in IEEE C802.16m07/217, "Wake-up Signal for 802.16m OFDMA Idle Mode" (Nov. 7, 2007). If an SS decodes the quick paging signal correctly, the SS needs to listen to the conventional paging signal; otherwise, the SS can go back to "sleep", thereby saving its resources, such as battery power.

U.S. Provisional Patent Application No. 61/014,471 filed on Dec. 18, 2007, which is now U.S. patent application Ser. No. 12/808 779, filed on Jun. 17, 2010, by the current inventors describes using unused subcarriers (i.e., unused system resources) in a preamble signal to send assigned code words for quick paging. The code words assigned to SSs can include unused conventional preamble sequences and orthogonal sequences, such as Walsh-Hadamard (W-H) sequences, or bi-orthogonal sequences, such as W-H sequences and their inverses. Those patent applications are incorporated here by reference.

For one example, a W-H code word can be used as the signal for quick paging as described in the patent applications cited above. With a 10-MHz-wide WiMAX channel using an FFT of length 1024 bits, the length of the conventional preamble is 284 bits. Thus, there are 568 unused subcarrier positions that can be used for a quick paging signal, and so a W-H code word of length 512 bits can be used. For a 5-MHz-wide WiMAX channel, the FFT size is 512 bits and the preamble length is 143 bits, and so 286 unused subcarrier positions are available for the quick paging signal, thereby allowing use of a W-H code word of length 256 bits. Other channel bandwidths, such as 8.75 MHz, can be accommodated in a similar manner. Each such quick paging code word can identify a respective group of SSs, and the presence of a code word in a DL signal indicates to the SS(s) to which that code word is assigned that those SS(s) are required to read the full paging message in a subsequent DL signal.

It is known that W-H code words do not have particularly desirable spectral properties, and so a pseudorandom-noise (PN) masking sequence can be combined with a W-H code word, e.g., by a logical exclusive-OR operation. As described in the above-cited patent applications, the PN masking sequence can be chosen as a sub-sequence of a length-1023 PN sequence that can be generated using a shift register. Different cells in a network can use different shifts of the PN sequence.

In cellular telephone networks using code division multiple access (CDMA), such as CDMA2000 and wideband CDMA (WCDMA) networks, paging groups are predefined by the applicable standards based on mobile station IDs. Similarly, a mapping between quick paging messages and mobile station IDs is also predefined. The cellular telephone architecture is centralized, and so a central node passes registration information about a mobile station to multiple cells in a paging area. Thus, the mobile station can be reached in any cell belonging to the assigned paging area using a quick paging message. Additionally, the mobile station informs the network whenever it enters a new cell that belongs to a different paging area, triggering defined paging area updating procedures.

Nevertheless, there is no quick paging mechanism standardized in WiMAX communication systems at this time, and thus no consideration of receiving methods and devices for such quick paging signals.

SUMMARY

This application describes methods and apparatus by which receiving stations or other network nodes can receive quick paging code words assigned by transmitting stations to the receiving stations. A receiving station can estimate the characteristics of the channel to the transmitting station based on a frame's preamble sequence and use correlation to detect the presence of an assigned code word. The receiving station can suppress interference from other transmitting stations in the correlation operation based on the nature of the interference signal. When the receiving station knows an interfering signal from another transmitting station, the receiving station can subtract the interfering signal before carrying out the correlation operation.

In accordance with aspects of this invention, there is provided a method of detecting a quick paging code word in a receiver in a communication system using a plurality of subcarriers for orthogonal frequency division multiple access. The method includes demodulating a portion of a received signal that corresponds to a predetermined preamble carried by a first set of the subcarriers; generating channel estimates based on the received preamble; interpolating the channel estimates over a second set of subcarriers that carries the quick paging code word and is different from the first set of subcarriers; and determining, based on the received signal and channel estimates, whether the received signal includes a quick paging code word.

Also in accordance with aspects of this invention, there is provided an apparatus for detecting a quick paging code word in a receiver in a communication system using a plurality of subcarriers for orthogonal frequency division multiple access. The apparatus includes a demodulator configured to demodulate a portion of a received signal that corresponds to a predetermined preamble carried by a first set of the subcarriers; a channel estimator configured to generate channel estimates based on the received preamble; and an electronic processor configured to interpolate the channel estimates over a second set of subcarriers that carries the quick paging code word and is different from the first set of subcarriers, and to determine, based on the received signal and channel estimates, whether the received signal includes a quick paging code word.

BRIEF DESCRIPTION OF THE DRAWINGS

The several features, objects, and advantages of this invention will be understood by reading this description in conjunction with the drawings, in which.

DETAILED DESCRIPTION

This description focusses on radio communication systems according to the WiMAX standards, but the artisan will understand that the invention in general covers other wireless communication systems.

Figure 1A:
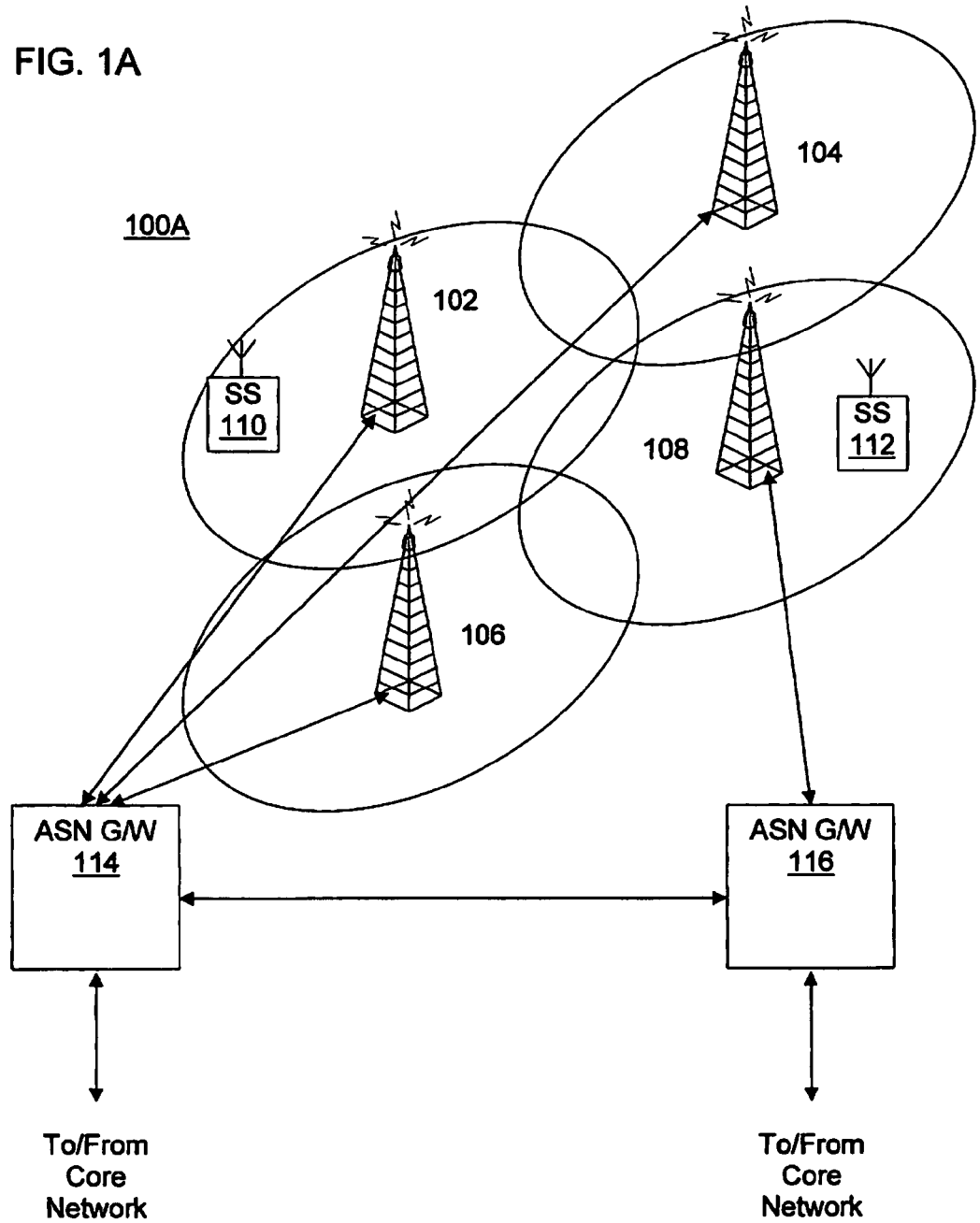
FIGS. 1A, 1B depict examples of telecommunication networks.
Figure 1B:
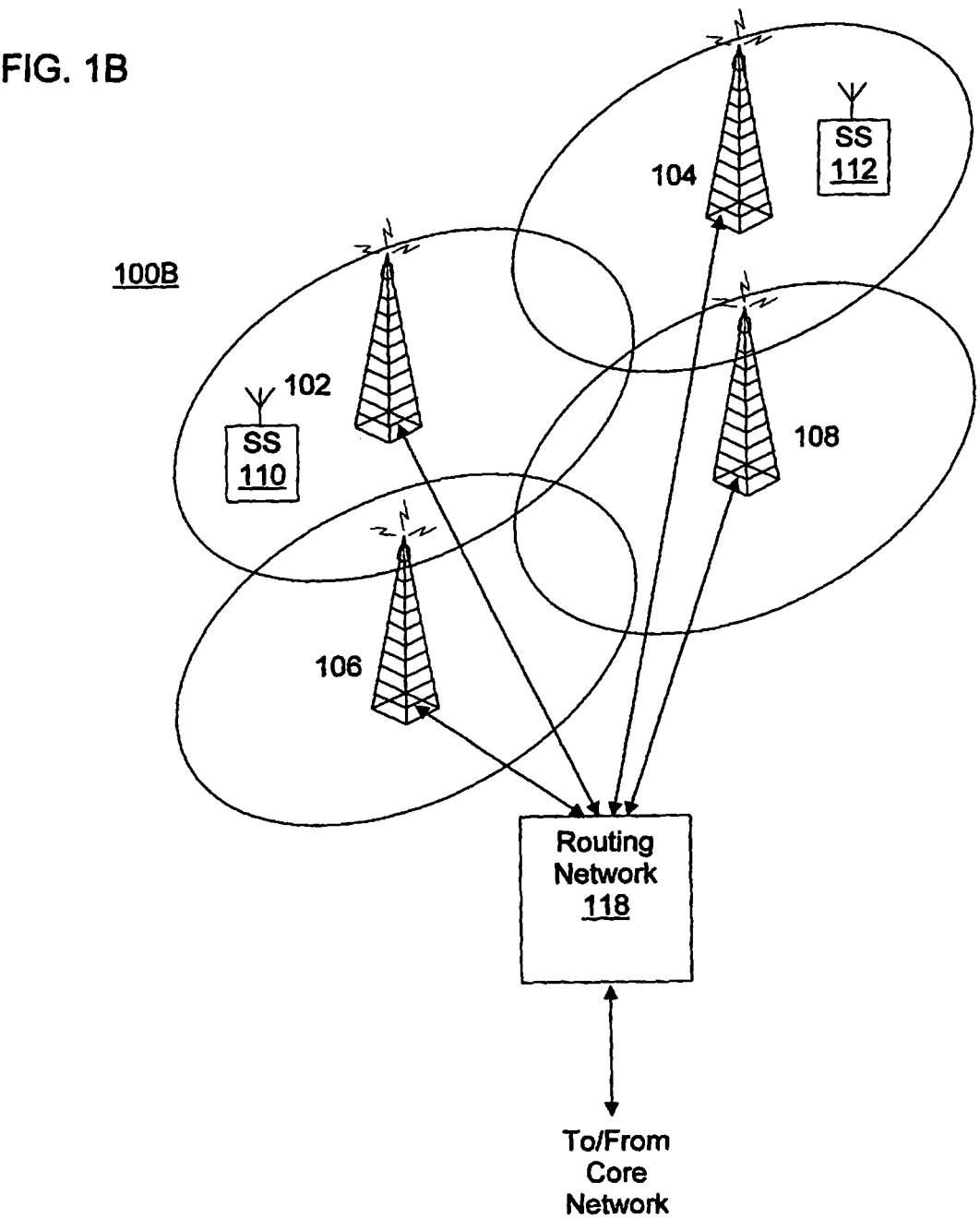
Figure 2A:
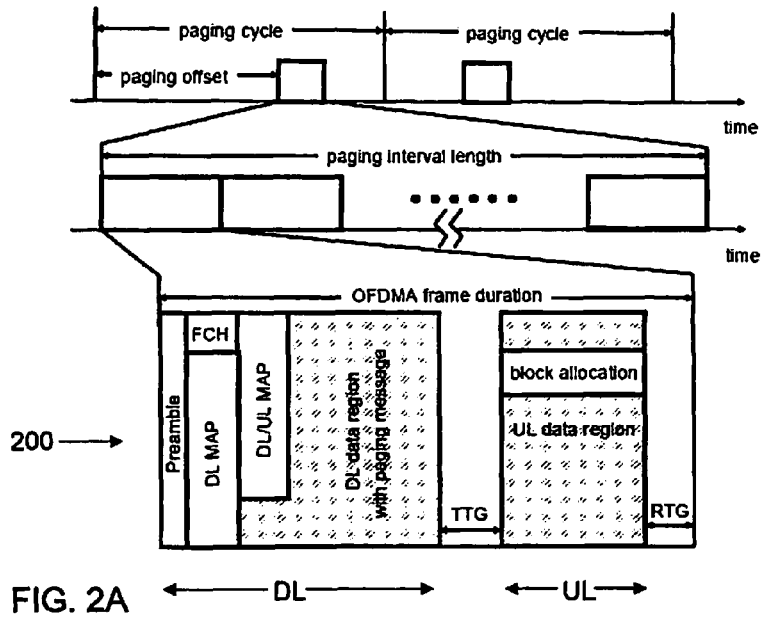
FIGS. 2A, 2B depict downlink and uplink signals organized as successions of frames.
Figure 2B:
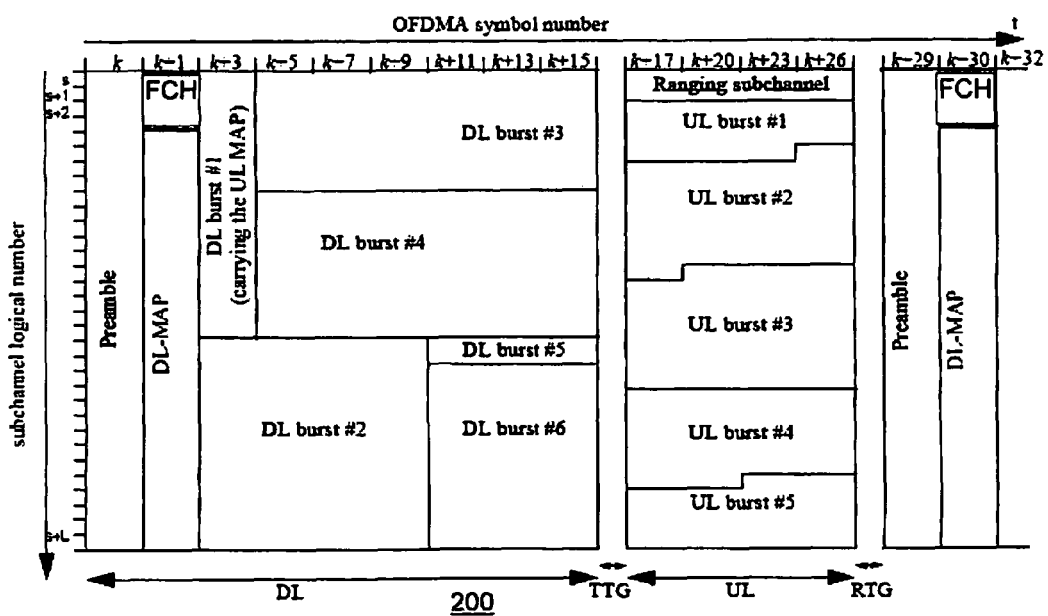

Section 8.4.6.1.1 of IEEE 802.16e-2005 defines the DL preamble, the position of which can be seen in the format depicted in FIGS. 2A, 2B, as one of three sets of subcarriers that are modulated by defined PN sequences using boosted binary phase shift keying (BPSK) modulation. The defined PN sequences are listed in Tables 309, 309a, 309b, and 309c of IEEE 802.16e-2005, and are generally called "preamble sequences" in this application. Other communication systems can use defined sequences equivalent to those defined in IEEE 802.16e-2005, and such sequences and sequences that may be defined by future developments of IEEE 802.16e-2005 are also "preamble sequences" for this application. A BS selects preamble sequences from the set of defined sequences for its use in its DL preambles.

Figure 3:
FIG. 3 depicts an arrangement of subcarriers for preamble signals.

As described in the patent applications cited and incorporated above, unused subcarriers (i.e., unused system resources) during a DL preamble signal can be used to carry quick paging code words, which can be unused preamble sequences or other suitable sequences, to signal one or more SSs. Referring to the conventional preamble subcarriers depicted in FIG. 3, such unused subcarriers would be numbered 1, 2, 4, 5, 7, 8, . . . , 1696, 1697, 1699, 1700, 1702, 1703, and a group of such unused subcarriers is used for a quick paging signal.

Among other things, the inventors have recognized that a SS or other receiving station in a network can estimate the characteristics of the communication channel between the SS and a BS or other transmitting station in the network based on the DL preamble sequence and use a correlation operation to detect the presence of an assigned quick-paging code word. If desired, the SS can suppress interference from other transmitting stations in the correlation operation based on the nature of the interference signal. When the SS knows an interfering signal from another BS, the SS can subtract the interfering signal before carrying out the correlation operation.

Figure 4A:
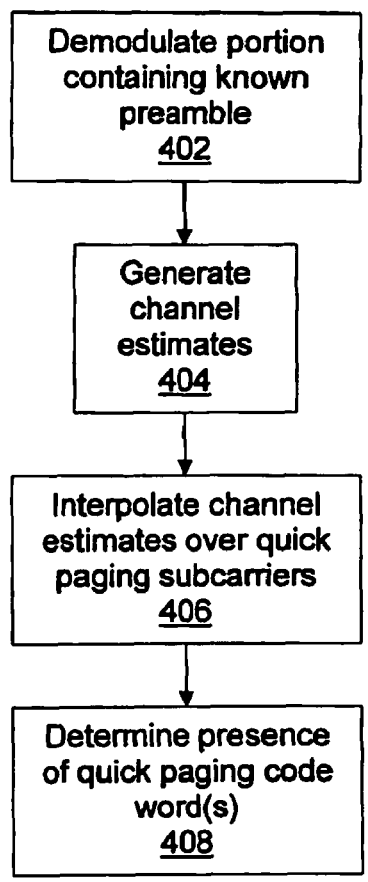
FIGS. 4A, 4B, 4C are flow charts of methods of receiving a quick paging signal.

A receiver for the quick paging signal described above can implement the steps depicted in FIG. 4A. In step 402, the SS demodulates the portion of a received DL signal that corresponds to the preamble, for example by performing an FFT on the received signal. In step 404, the SS generates channel estimates based on the known preamble, and in step 406, the SS interpolates the channel estimates over the subcarriers that do not carry the preamble but do carry the quick paging code word(s). In step 408, the SS determines whether its received signal includes its assigned quick-paging code word(s) based on the received signal and the channel estimates.

For example in carrying out step 408, the SS can correlate the received signal using the interpolated channel estimates against locally stored or generated version(s) of its assigned quick paging code word(s), and compare the correlation result, or metric, to a threshold, which is preferably normalized to the energy of the received signal. If the correlation metric exceeds the threshold, then the SS has determined that its received signal includes its assigned code word(s), and the SS can decode the full conventional paging signal. If the correlation metric does not exceed the threshold, the SS has determined that an assigned code word is not present in its received signal, and the SS can go back to "sleep" mode.

If the SS has multiple receiving antennas, the SS can compute separate correlation metrics for the signals from each antenna, sum the separate correlation metrics, and then compare the summed metric to the threshold. On a given antenna, if the channel estimate on each subcarrier of interest is denoted by c(k), the received signal is denoted by r(k), the quick-paging code word symbol is denoted by b(k), and the PN mask sequence is denoted by m(k), then the correlation metric R is given by:

$$R = \text{Re}\left\{\sum_k r(k)c^*(k)b(k)m(k)\right\}$$

in which k is an index of the PN mask sequence lag or time offset, Re{.} indicates the real part, * indicates the complex conjugate, and b(k) and m(k) take values of either −1 or +1.

As an alternative to computing a correlation metric R for each of its assigned code words, the SS can compute correlation metrics for all quick paging W-H code words simultaneously by carrying out in step 408 a fast Walsh transform (FWT) based on the modified "signal" r(k)c*(k)m(k). If an assigned W-H code word is one of the largest few elements in the FWT result, the SS has determined that its assigned code word is present in its received signal, and the SS can decode the full conventional paging signal.

It will be understood that the correlation metrics for the bi-orthogonal counterparts of the quick paging code words are just the negatives of the metrics calculated above. Moreover, maximizing the correlation metric as above is equivalent to minimizing the total squared error between the received signal and the code word modified by the channel estimate.

If the number of W-H code words and PN mask sequence offsets assigned to the entire set of SSs in a particular cell is limited, the SSs would be assigned to a paging group as described in the patent applications cited and incorporated by reference above. Determinations by SSs corresponding to a paging group that a quick paging code word corresponding to the particular paging group is present in their received signals would cause the SSs in the paging group to read the DL-MAP. It will be understood that the SS's probability of detecting the quick paging signal of its paging group can increase because, after an FWT, the SS's probability of detecting paging signals corresponding to other paging groups is decreased. In addition, the false-alarm rate, i.e., the rate that a SS determines that its assigned code word is present when it is not, should be less, although the false-alarm rate may not be of much concern as described below.

The interference in a SS's received signal in the preceding computations is assumed to be additive white Gaussian noise (AWGN). If desired, the potential for interference cancellation can be exploited by a minimum mean square error (MMSE) or interference rejection combining (IRC) receiver, which is described in the literature, such as U.S. Pat. No. 5,680,419 to Bottomley for "Method of and Apparatus for Interference Rejection Combining in Multi-Antenna Digital Cellular Communication Systems". An IRC receiver typically chooses the code word that minimizes the squared error after spatial noise whitening, but the inventors have recognized that better performance can be obtained when the IRC receiver uses knowledge of the desired and interfering signals.

In a system using quick paging as described above, the quick paging signal to be detected is a BPSK signal, and the interfering signals, which primarily consist of preamble and quick paging signals from other base stations, are also BPSK signals. In such a signal environment, a SS can implement a method of interference cancelation in the course of determining whether a quick paging code word is present in its received signal (step 408).

Figure 4B:
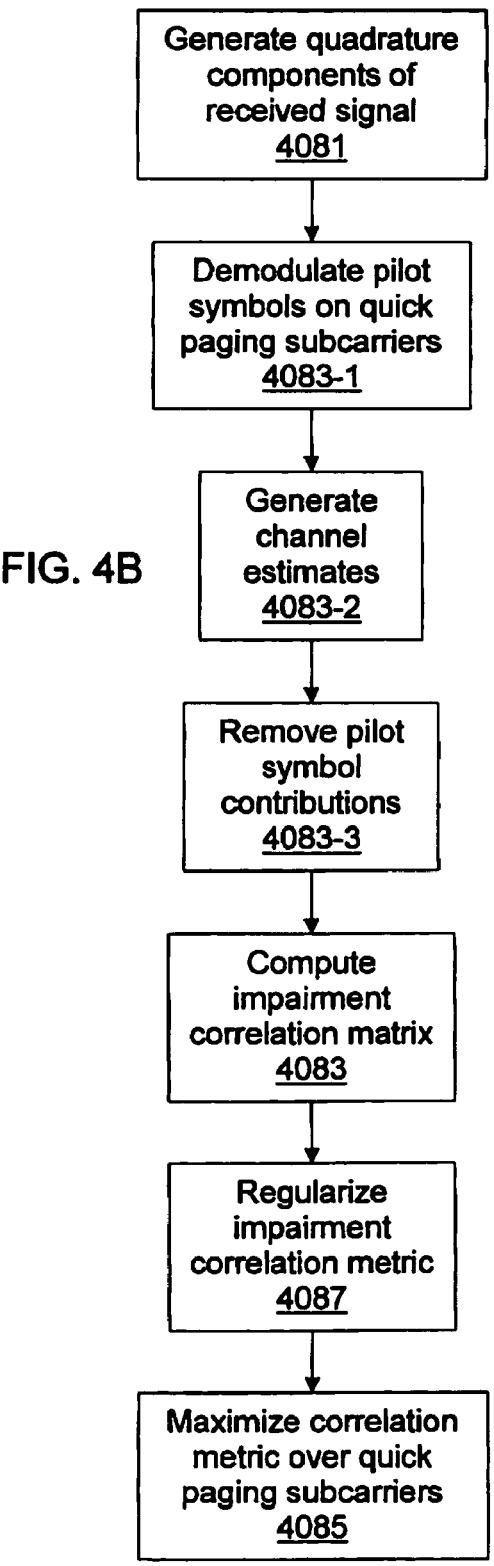
Figure 4C:
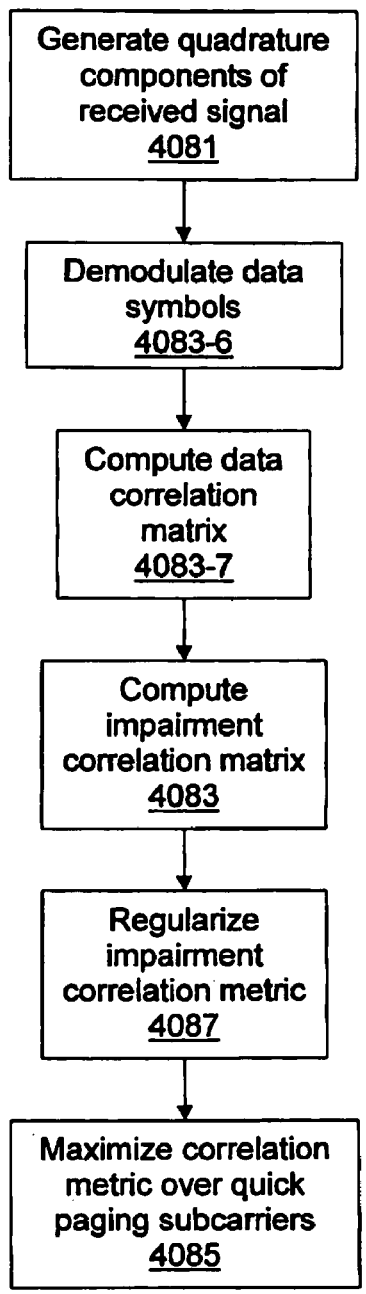

FIGS. 4B, 4C are flow charts illustrating such interference cancelation methods, which advantageously include Single Antenna Interference Cancellation (SAIC) methods that have been applied in cellular telecommunication systems, such as GSM/GPRS systems as described in Third Generation Partnership Project (3GPP) Technical Report (TR) 45.903 V6.0.1, Feasibility Study on Single Antenna Interference Cancellation (SAIC) for GSM Networks (Release 6) (November 2004). A SAIC receiver separates a complex baseband received signal into in-phase and quadrature components (step 4081), which are treated as signals that are received from two antennas. If the receiver has two physical antennas, the signal is treated as received on four branches.

On subcarrier k, let the signals received on antenna 1 and antenna 2 be denoted by $r_1(k)$ and $r_2(k)$, respectively, and the channel estimates on subcarrier k for antenna 1 and antenna 2 be denoted by $c_1(k)$ and $c_2(k)$, respectively. The receiver separates the signal $r_1(k)$ into its in-phase component $r_1^I(k)$ and its quadrature component $r_1^Q(k)$, and the signal $r_2(k)$ into its in-phase component $r_2^I(k)$ and its quadrature component $r_2^Q(k)$. Thus, the received signal can be written in matrix, or vector, form as follows:

$$\begin{pmatrix} r_1(k) \\ r_2(k) \end{pmatrix} = \begin{pmatrix} c_1(k) \\ c_2(k) \end{pmatrix} b(k)m(k) + \begin{pmatrix} n_1(k) \\ n_2(k) \end{pmatrix}$$

where $n_1(k)$ and $n_2(k)$ are the noise (impairment) signals on the two antennas, consisting of interference and additive noise, the other parameters are as described above, and it is recognized that b(k) and m(k) are real. The preceding expression can be expressed in terms of the in-phase and quadrature components as follows:

$$\begin{pmatrix} r_1^I \\ r_1^Q \\ r_2^I \\ r_2^Q \end{pmatrix} = \begin{pmatrix} c_1^I \\ c_1^Q \\ c_2^I \\ c_2^Q \end{pmatrix} b(k)m(k) + \begin{pmatrix} n_1^I \\ n_1^Q \\ n_2^I \\ n_2^Q \end{pmatrix}$$

which can be equivalently expressed as:

$r(k)=c(k)b(k)m(k)+n(k)$ in which bold-face type denotes a vector.

Due to the primarily BPSK nature of the impairment signal, the in-phase and quadrature components from the two antennas are highly correlated. If the impairment is Gaussian, the receiver should minimize the squared error metric while whitening the noise in determining the presence of quick paging code word(s) as described above. For each subcarrier k, the value E(k) of that squared error metric is given by:

$E(k)=(r(k)-c(k)b(k)m(k))^T(R_n(k))^{-1}(r(k)-c(k)b(k)m(k))$ where $(\ )^T$ denotes the transpose, and $R_n(k)$ is an impairment correlation matrix that is given by:

$R_n(k)=E\{n(k)n^T(k)\}$ in which E{.} denotes the expected value. The best estimate of the quick paging code word is given by that code word b(k), among all possible choices of b(k), that minimizes the error e over the quick paging subcarriers given by the following:

$$e = \sum_k E(k)$$

Expanding E(k) gives the following expression:

$E(k)=(r^T(k)(R_n(k))^{-1}r(k)-2r^T(k)(R_n(k))^{-1}c(k)b(k)m(k)+c^T(k)(R_n(k))^{-1}c(k)(b(k)m(k))^2$.

The first and last terms in the preceding expression are independent of b(k) because b(k) and m(k) are both binary values and thus the square is the same for all code words. Minimizing the error e is therefore equivalent to maximizing the correlation metric R over the subcarriers k, which is given by:

$R=\Sigma r^T(k)(R_n(k))^{-1}c(k)m(k)b(k)$.

The maximization can be achieved by computing the impairment correlation matrix (step 4083 in FIGS. 4B, 4C) and taking the FWT (step 4085) of the sequence of scalar quantities $r^T(k)(R_n(k))^{-1}c(k)m(k)$. The matrix $R_n(k)$ of impairment correlation values can be computed in various alternative ways, two of which are depicted in FIGS. 4B, 4C.

For a first example depicted by FIG. 4B, pilot symbols at the level of the code word can be transmitted by a BS on a set of the otherwise unused subcarriers that is known to the SS. As discussed above, there are 568 unused subcarriers in the case of a 10-MHz-wide WiMAX channel, and the length of the quick paging code word can be 512 bits (subcarriers). Thus, fifty-six pilot symbols can be interspersed with the bits of the quick paging code words. The SS demodulates such pilot symbols (step 4083-1) and in a conventional way generates channel estimates based on the demodulated pilot symbols (step 4083-2). Using channel estimates based on such pilot symbols and knowledge of the relative transmitted power levels of the preamble and the quick paging code word, the contribution of the pilot symbol can be subtracted (step 4083-3), leaving the impairment by itself, from which the impairment correlation matrix $R_n(k)$ can be computed.

It is currently believed that the impairment correlation matrix has to be interpolated to all code word locations, and a sufficient number and dispersal of pilot symbol subcarriers are needed to achieve this. In terms of the known pilot symbols p(k), and the ratio α of the transmitted power levels of the pilot subcarriers and the preamble subcarriers, the correlation matrix over a given subcarrier k is given by:

$R(k)=[r(k)-\alpha c(k)p(k)][r(k)-\alpha c(k)p(k)]^T$ in which the parameters are as described above.

For a second example depicted by FIG. 4C, the computations can be simplified by noting that the impairment and the quick paging code word are uncorrelated. Thus, the impairment correlation matrix can be computed (step 4083) by demodulating some of the DL data symbols (step 4083-6), computing the data correlation matrix (step 4083-7), and computing the difference of the data correlation matrix and the correlation matrix of the code word. Since the code word is binary, its correlation matrix depends only on the channel estimates, which the receiver has determined (step 404) based on the known preamble, and the power level of the code word, which can be known if the relative power of the code word with respect to the preamble is either predetermined in the network or broadcast by the BS. As an alternative, the receiver can estimate the power level difference based on the levels of its received preambles and code words. The impairment correlation matrix thus obtained can be smoothed in order to even out localized effects, and in that case, the correlation matrix is given by:

$$R(k) = r(k)r^T(k) - \alpha^2 c(k)c^T(k)|b(k)m(k)|^2$$
$$= r(k)r^T(k) - \alpha^2 c(k)c^T(k)$$

in which the parameters are as described above.

In both of the preceding examples, the impairment correlation matrix computed over a single subcarrier k is of rank 1. Even after interpolation or smoothing, the resulting impairment correlation matrix is most likely of low rank and is singular. Since the inverse of the impairment correlation matrix is needed in the calculation of the metric E(k), regularization can be achieved by adding to R(k) a diagonal matrix of low variance dependent on the received signal level, e.g., a diagonal matrix having elements equal to the average level of the signal scaled by a suitable scale factor. The scale factor can be selected such that the elements of the diagonal matrix have an amplitude that is lower than the amplitude of the expected impairment level.

In a WiMAX system, a SS most likely knows the preambles used by neighboring BSs, which would be the BSs in its "active set". That preamble information is typically included in broadcast messages or handover-related messages transmitted by the SS's serving BS. The SS conventionally attempts to synchronize to the preambles of neighboring BSs in order to assess their suitability for a cell change, or handover. In such a situation, the SS can subtract the contribution of the neighbor cell preambles before attempting the reception process described above, which can further improve the SS's accuracy in determining the presence of its quick paging code word(s) in its received signal. Thus in carrying out step 404, the SS generates channel estimates for the channel of a neighbor cell based on the neighbor cell's preamble, e.g., by correlating its received signal with the neighbor's known preamble sequence on a per-subcarrier basis. The SS can smooth the generated per-subchannel channel estimates across the subcarriers, e.g., by suitable filtering, to suppress noise, Then in step 408, the neighbor channel estimates are multiplied by the known neighbor preamble signal to obtain a postulated received preamble signal that the SS can then subtract from its received signal. The SS then manipulates the resulting signal as described above, completing the step of determining the presence of its quick paging code word(s).

Figure 5:
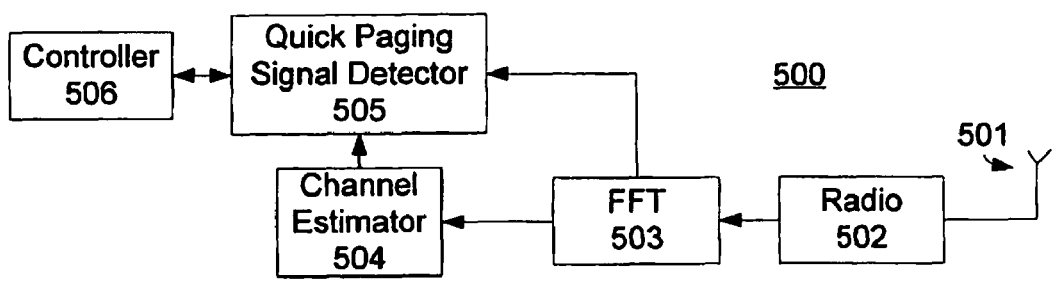
FIG. 5 is a block diagram of a receiving station.

FIG. 5 is a block diagram of a portion of a receiving station 500, such as a SS in a WiMAX OFDMA network 100, that can receive the quick paging setup information and code words for the methods described above. It will be appreciated that the functional blocks depicted in FIG. 5 can be combined and re-arranged in a variety of equivalent ways, and that many of the functions can be performed by one or more suitably programmed digital signal processors and other known electronic circuits.

The receiving station 500 includes one or more suitable antennas 501 for receiving DL signals transmitted by BSs. The received signals are provided to a suitable OFDM radio receiver 502 that spectrally translates the received signals to a more convenient portion of the spectrum, e.g., base band. The signal produced by the radio 502 is demodulated by a suitable processor 503 for OFDM demodulation, such as an FFT, and the processor 503 communicates with a channel estimator 504 and a quick paging signal detector 505. As depicted in FIG. 5, the receiving station 500 operates under the control of a suitably programmed controller 506. OFDMA symbols carried by received DL signals are decoded by the controller 506 based on signals generated by the processor 503 and on channel estimates generated by the estimator 504. As described above, the channel estimates can be generated based on the preamble symbol(s) and/or additional pilot symbols. The controller 506 typically provides the decoded symbols to further processing in the node 500, and determines whether the SS needs to wake up in a subsequent frame to read a conventional paging signal.

The detector 505, which can be a correlator, detects the presence in received DL signals of quick paging code words associated with the receiver 500. As described above, the receiving station 500 can determine whether it has received its corresponding quick paging code word by correlating its received signal against the set of quick paging code words that correspond to the node 500. The controller is suitably programmed to compute correlation metrics for the quick paging code words corresponding to its PG based on signals from the detector 505. The controller 506 determines which quick paging code word was transmitted based on the difference between the metrics.

The following description relates to link and system simulations of a WiMAX network that employs quick paging code words as described above. The system simulation included path loss, antenna patterns, and shadow fading for a network of BSs having three sectors per BS and uniformly distributed SSs. A wrap-around procedure was used to eliminate edge effects. The segments of the BSs were logged, and for each SS, the preamble was generated with a randomly chosen IDCel, and a quick paging code word was "transmitted" at a specified power level lower than the preamble's power level. For interfering cells, different preambles were generated at signal power levels lower than the serving cell's preamble power level, as obtained from the system simulation in the corresponding segments, and quick paging signals in the rest of the subcarriers at a similar offset to that between the serving cell preamble and the serving cell code word were generated. AWGN was added at a level corresponding to a given noise figure. The signals from the different BSs to the SSs passed through different radio channels. The simulated channel was applied to the signal from each BS, and the combined signal was then received by a SS. Since the relative signal levels from the system simulation, corresponding to a BS transmit power, were used, the average carrier-to-interference ratio (CINR) achieved was fixed. For each set of channel realizations from the different base stations, many noise realizations were used for averaging, and multiple sets of channel realizations were also used.

The performance of the simulation was characterized in terms of a Missed Detection probability and a False Alarm probability. A missed detection occurred when the BS sent the assigned code word to a SS, but the SS did not determine that the code word was present; thus, the SS would not read the full conventional paging signal intended to it, which is detrimental to the paging performance of the network. A false alarm occurred when the SS determined that its assigned code word was sent when the BS sent a different code word. A false alarm would cause the SS to read the full paging message, and thus would not be detrimental to the paging performance of the system, although it would decrease the battery life of the SS.

The parameters used in the simulation are shown in the following Table 1.

TABLE 1

| Aspect | Value |
| --- | --- |
| Number of Cells/Sites | 57/19 |
| Reuse | 1/1 (1/3 for preamble) |
| Path Loss Model | ITU Vehicular |
| Site-to-Site Distance | 2.8 kilometers (km) |
| Penetration Loss | None |
| Shadowing Standard Deviation | 8 dB |
| Shadowing Correlation Distance | 100 meters (m) |
| Bandwidth | 10 MHz |
| FFT Size | 1024 |
| Transmit Power (for Preamble) | 20 watts (W) |
| Noise Figure | 9 dB |
| Channel Model | Pedestrian B |
| Relative Power of Paging Signal | −20 dB |
| Codeword Size | 512 |

Figure 6:
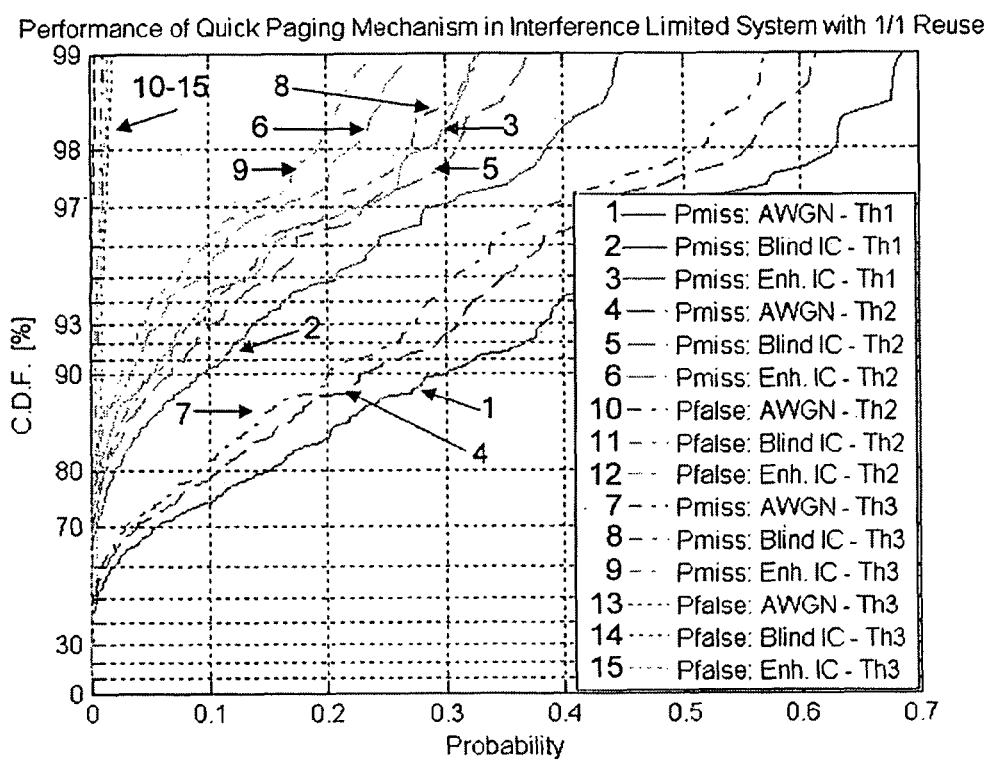
FIG. 6 shows results of simulations of quick paging methods.

FIG. 6 shows results of the simulation as cumulative distribution functions (CDFs) of the Missed Detection probability and the False Alarm probability. A non-interference-canceling receiver is denoted AWGN in FIG. 6 (curves 1, 4, 7, 10, 13), since it makes an AWGN assumption for the impairment; an interference-cancelling receiver is denoted Blind IC in FIG. 6 (curves 2, 5, 8, 11, 14), since it assumes no knowledge of the interferer preambles; and an enhanced interference cancelling receiver is denoted Enh. IC in FIG. 6 (curves 3, 6, 9, 12, 15), since it assumes knowledge of the interferer preambles.

FIG. 6 shows results for three different threshold values corresponding to the selection of the top N candidates at the output of the W-H operation. Curves 1, 2, 3 designated Th1 had N=1; curves 4, 5, 6, 7, 8, 9 designated Th2 had N=2; and curves 10, 11, 12, 13, 14, 15 designated Th3 had N=3. It can be seen in FIG. 6 that with more relaxed threshold values (higher values of N), the Missed Detection probability is reduced at the price of increased False Alarm probability.

With the simulated non-interference-canceling receiver, the number of users seeming to experience a Missed Detection probability of 10% or greater can be significant. For example, FIG. 6 shows that 20%-25% of such users experience such a Missed Detection probability, but the probability of missed detection improves with the degree of interference cancellation used. With the blind interference-cancelling receiver, 6%-10% of users have a Missed Detection probability of 10% or greater, and with the enhanced interference-cancelling receiver, 4%-6% of users have a Missed Detection probability of 10% or greater. Curves 10-15 in FIG. 6 show that False Alarm probability was maintained at about 1% or less for all users, and so more relaxed thresholds could have been used to improve the Missed Detection probability.

Moreover, the improved simulated performance of the enhanced interference-cancelling receiver indicates the benign effect in the simulation of the quick paging signal on the performance of neighbor-cell-preamble measurements. Neighbor-cell preambles were detected reliably, which led to reliable subtraction, which improved the performance.

The invention enables reliable reception of a quick paging signal, thereby improving battery life of the SS. If interference cancelling reception is used, the quick paging signal can use lower power, thereby reducing the impact on operations that require detection of the preamble signal.

It will be appreciated that procedures described above are carried out repetitively as necessary, for example, to respond to the time-varying nature of communication signals exchanged by transmitters and receivers. Descriptions and examples of principles, aspects, and embodiments of this invention are intended to encompass both structural and functional equivalents, and it is intended that such equivalents include both currently known functional equivalents as well as functional equivalents developed in the future, regardless of structure. The artisan will also appreciate that block diagrams can represent conceptual views of illustrative circuitry embodying the principles of the technology and that flow charts, state transition diagrams, pseudocode, and the like represent processes which may be substantially represented in a computer-readable medium and so executed by a computer or programmable processor, whether or not such computer or processor is explicitly shown.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless transceivers implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of detecting a quick paging code word in a receiver in a communication system using a plurality of subcarriers for orthogonal frequency division multiple access, comprising:
   demodulating a portion of a received signal that corresponds to a predetermined preamble carried by a first set of the subcarriers;
   generating channel estimates based on the received preamble;
   interpolating the channel estimates over a second set of the subcarriers that carries the quick paging code word and is different from the first set of the subcarriers; and
   determining, based on the received signal and the channel estimates, whether the received signal includes a quick paging code word, wherein determining includes correlating the received signal using the channel estimates against a local version of the quick paging code word and wherein the correlating includes computing a correlation metric R according to:

$$R = \mathrm{Re}\left\{\sum_k r(k)c^*(k)b(k)m(k)\right\}$$

in which Re indicates a real part, k is an index of time offset, r(k) represents the received signal, c*(k) represents a complex conjugate of a channel estimate, b(k) represents the quick paging code word, and m(k) represents a known pseudorandom-noise sequence.

2. A method of detecting a quick paging code word in a receiver in a communication system using a plurality of subcarriers for orthogonal frequency division multiple access, comprising:
   demodulating a portion of a received signal that corresponds to a predetermined preamble carried by a first set of the subcarriers;
   generating channel estimates based on the received preamble;
   interpolating the channel estimates over a second set of the subcarriers that carries the quick paging code word and is different from the first set of the subcarriers; and
   determining, based on the received signal and the channel estimates, whether the received signal includes a quick paging code word, wherein determining includes correlating the received signal using the channel estimates against a local version of the quick paging code word wherein the quick paging code word is included in a set of quick paging code words that are Walsh-Hadamard sequences, and the correlating includes computing a fast Walsh transform for the set of quick paging code words and determining from a result of the fast Walsh transform whether the quick paging code word was present in the received signal and by canceling an interference in the received signal, wherein the interference includes at least one other predetermined preamble or one other quick paging code word by maximizing a correlation metric by taking the fast Walsh transform of a sequence of scalar quantities obtained by modifying a received signal on a subcarrier by a correlation matrix corresponding to the interference on the second set of the subcarriers and a channel estimate on the second set of the subcarriers, wherein the scalar quantities are given by:

$$r^T(k)(R_n(k))^{-1}c(k)m(k)$$

in which k is an index of time offset, $r^T(k)$ is a transpose of a vector that represents the received signal, $R_n(k)$ is an impairment correlation matrix, c(k) is a vector that represents a channel estimate, and m(k) represents a known pseudorandom-noise sequence.

3. The method of claim 2, wherein a diagonal matrix of low variance is added to the correlation matrix.

4. An apparatus for detecting a quick paging code word in a receiver in a communication system using a plurality of subcarriers for orthogonal frequency division multiple access, comprising:
   a demodulator configured to demodulate a portion of a received signal that corresponds to a predetermined preamble carried by a first set of the subcarriers;
   a channel estimator configured to generate channel estimates based on the received preamble; and
   an electronic processor configured to interpolate the channel estimates over a second set of the subcarriers that carries the quick paging code word and is different from the first set of the subcarriers, and to determine, based on the received signal and the channel estimates, whether the received signal includes a quick paging code word, wherein the electronic processor is configured to determine whether the received signal includes the quick paging code word by correlating the received signal using the channel estimates against a local version of the quick paging code word wherein the correlating includes computing a correlation metric R according to:

$$R = \mathrm{Re}\left\{\sum_k r(k)c^*(k)b(k)m(k)\right\}$$

in which Re indicates a real part, k is an index of time offset, r(k) represents the received signal, c*(k) represents a complex conjugate of a channel estimate, b(k) represents the quick paging code word, and m(k) represents a known pseudorandom-noise sequence.

5. An apparatus for detecting a quick paging code word in a receiver in a communication system using a plurality of subcarriers for orthogonal frequency division multiple access, comprising:
   a demodulator configured to demodulate a portion of a received signal that corresponds to a predetermined preamble carried by a first set of the subcarriers;
   a channel estimator configured to generate channel estimates based on the received preamble; and
   an electronic processor configured to interpolate the channel estimates over a second set of the subcarriers that carries the quick paging code word and is different from the first set of the subcarriers, and to determine, based on the received signal and the channel estimates, whether the received signal includes a quick paging code word by correlating the received signal using the channel estimates against a local version of the quick paging code word wherein the quick paging code word is included in a set of quick paging code words that are Walsh-Hadamard sequences, and the correlating includes computing a fast Walsh transform for the set of quick paging code words and determining from a result of the fast Walsh transform whether the quick paging code word was present in the received signal and by canceling an interference in the received signal wherein the interference includes at least one other predetermined preamble or one other quick paging code word by maximizing a correlation metric by taking the fast Walsh transform of a sequence of scalar quantities obtained by modifying a received signal on a subcarrier by a correlation matrix corresponding to the interference on the second set of the subcarriers and a channel estimate on the second set of the subcarriers wherein the scalar quantities are given by:

$$r^T(k)(R_n(k))^{-1}c(k)m(k)$$

in which k is an index of time offset, $r^T(k)$ is a transpose of a vector that represents the received signal, $R_n(k)$ is an impairment correlation matrix, $c(k)$ is a vector that represents a channel estimate, and $m(k)$ represents a known pseudorandom-noise sequence.

6. The apparatus of claim 5, wherein the electronic processor is configured to add a diagonal matrix of low variance to the correlation matrix.

* * * * *

UNITED STATES PATENT AND TRADEMARK OFFICE
CERTIFICATE OF CORRECTION

PATENT NO. : 8,259,827 B2
APPLICATION NO. : 12/355606
DATED : September 4, 2012
INVENTOR(S) : Ramesh et al.

It is certified that error appears in the above-identified patent and that said Letters Patent is hereby corrected as shown below:

In Column 8, Line 30, delete "$R=\Sigma r^T(k)(R_n(k))-1$" and insert -- $R=\Sigma r^T(k)(R_n(k))^{-1}$ --, therefor.

In Column 10, Line 44, delete "IDCel," and insert -- IDCell, --, therefor.

In Column 10, Line 59, delete "ratio" and insert -- plus noise ratio --, therefor.

Signed and Sealed this
Twentieth Day of November, 2012

David J. Kappos
*Director of the United States Patent and Trademark Office*